United States Patent
Kojima et al.

(10) Patent No.: US 9,583,765 B2
(45) Date of Patent: Feb. 28, 2017

(54) POSITIVE ELECTRODE ACTIVE MATERIAL FOR SODIUM ION SECONDARY BATTERY, POSITIVE ELECTRODE, AND SODIUM ION SECONDARY BATTERY

(71) Applicants: KABUSHIKI KAISHA TOYOTA JIDOSHOKKI, Kariya-shi, Aichi-ken (JP); NATIONAL INSTITUTE OF ADVANCED INDUSTRIAL SCIENCE AND TECHNOLOGY, Chiyoda-ku, Tokyo-to (JP)

(72) Inventors: Akira Kojima, Kariya (JP); Kazuhito Kawasumi, Kariya (JP); Junichi Niwa, Kariya (JP); Yuta Ikeuchi, Ikeda (JP); Toshikatsu Kojima, Ikeda (JP); Tetsuo Sakai, Ikeda (JP)

(73) Assignees: KABUSHIKI KAISHA TOYOTA JIDOSHOKKI, Aichi (JP); NATIONAL INSTITUTE OF ADVANCED INDUSTRIAL SCIENCE AND TECHNOLOGY, Tokyo (JP)

(*) Notice: Subject to any disclaimer, the term of this patent is extended or adjusted under 35 U.S.C. 154(b) by 222 days.

(21) Appl. No.: 14/247,434

(22) Filed: Apr. 8, 2014

(65) Prior Publication Data
US 2014/0308579 A1 Oct. 16, 2014

(30) Foreign Application Priority Data
Apr. 10, 2013 (JP) .................... 2013-082124

(51) Int. Cl.
H01M 4/58 (2010.01)
H01M 4/525 (2010.01)
(Continued)

(52) U.S. Cl.
CPC ......... *H01M 4/5825* (2013.01); *H01M 4/131* (2013.01); *H01M 4/366* (2013.01);
(Continued)

(58) Field of Classification Search
CPC .......... H01M 10/054; H01M 10/0568; H01M 60/122; H01M 4/5825; H01M 4/525;
(Continued)

(56) References Cited

U.S. PATENT DOCUMENTS

| 2011/0008233 A1 | 1/2011 | Miyanaga et al. |
| 2011/0031105 A1 | 2/2011 | Miyanaga |
| 2012/0264019 A1 | 10/2012 | Saka |

FOREIGN PATENT DOCUMENTS

| JP | 2003292309 A | 10/2003 |
| JP | 201134963 A | 2/2011 |

(Continued)

OTHER PUBLICATIONS

Communication dated May 7, 2015, issued by the Japanese Patent Office in counterpart Application No. 2013082124.

*Primary Examiner* — Laura Weiner
(74) *Attorney, Agent, or Firm* — Sughrue Mion, PLLC

(57) ABSTRACT

Provided are a positive electrode active material for a sodium ion secondary battery, and a positive electrode and a sodium ion secondary battery using the material. The positive electrode active material for a sodium ion secondary battery comprises a lithium sodium-based compound containing lithium (Li), sodium (Na), iron (Fe), and oxygen (O).

8 Claims, 4 Drawing Sheets

(51) Int. Cl.
*H01M 10/054* (2010.01)
*H01M 4/36* (2006.01)
*H01M 4/131* (2010.01)
*H01M 10/0568* (2010.01)
*H01M 4/62* (2006.01)

(52) U.S. Cl.
CPC ......... *H01M 4/525* (2013.01); *H01M 10/054* (2013.01); *H01M 4/364* (2013.01); *H01M 4/625* (2013.01); *H01M 10/0568* (2013.01); *Y02E 60/122* (2013.01)

(58) Field of Classification Search
CPC ...... H01M 4/131; H01M 4/364; H01M 4/366; H01M 4/625; Y02E 60/122
See application file for complete search history.

(56) References Cited

FOREIGN PATENT DOCUMENTS

| JP | 201154564 A | 3/2011 |
|----|---|---|
| JP | 2011134551 A | 7/2011 |
| JP | 2011181486 A | 9/2011 |
| JP | 2012-104477 A | 5/2012 |

POSITIVE ELECTRODE ACTIVE MATERIAL FOR SODIUM ION SECONDARY BATTERY, POSITIVE ELECTRODE, AND SODIUM ION SECONDARY BATTERY

TECHNICAL FIELD

The present invention relates to a positive electrode active material for a sodium ion secondary battery, a positive electrode and a sodium ion secondary battery.

BACKGROUND OF THE INVENTION

Nonaqueous electrolyte secondary batteries are widely used as power sources of portable electronic devices. Composite oxides such as $LiCoO_2$ and $LiMn_2O_4$ are mainly used as positive electrode active materials of the nonaqueous electrolyte secondary batteries. Moreover, it has been proposed to use a lithium silicate compound $Li_2MSiO_4$ (M: a transition metal element) as a positive electrode active material (See Patent Document 1).

In recent years, nonaqueous electrolyte secondary batteries have been considered to be used not only in portable electronic devices but also in vehicles. In order to expand use of the nonaqueous electrolyte secondary batteries as power sources in vehicles, a sufficient amount of lithium resources needs to be secured.

The amount of lithium resources, however, is limited, so battery materials to be used instead of these materials are now under development. Among them, sodium is rich in resources and sodium ion secondary batteries using sodium are being studied.

RELATED LITERATURE

Patent Document

[Patent Document 1] Japanese Unexamined Patent Publication No. 2012-104477

SUMMARY OF THE INVENTION

Problems to be Solved by the Invention

The present inventors have developed a positive electrode active material to be used in a sodium ion secondary battery.

The present invention has been made in view of the abovementioned circumstances. It is an object of the present invention to provide a novel positive electrode active material for a sodium ion secondary battery, and a positive electrode and a sodium ion secondary battery using the positive electrode active material.

Means for Solving Problems

A positive electrode active material of the present invention for a sodium ion secondary battery characteristically comprises a lithium sodium-based compound containing lithium (Li), sodium (Na), iron (Fe), and oxygen (O).

A positive electrode of the present invention for a sodium ion secondary battery has the abovementioned positive electrode active material for a sodium ion secondary battery.

A sodium ion secondary battery of the present invention characteristically has the abovementioned positive electrode for a sodium ion secondary battery, a negative electrode having a negative electrode active material, and an electrolyte.

Advantageous Effects of the Present Invention

In the present invention, a positive electrode active material for a sodium ion secondary battery comprises a lithium sodium-based compound containing Li, Na, Fe and O. The lithium sodium-based compound is a novel positive electrode active material for a sodium ion secondary battery. Therefore, the present invention can provide a novel positive electrode active material for a sodium ion secondary battery, and a positive electrode and a sodium ion secondary battery using the positive electrode active material.

PREFERRED EMBODIMENTS OF THE PRESENT INVENTION

Embodiments of the present invention will be described in detail.

(1) Positive Electrode Active Material for Sodium Ion Secondary Battery

A positive electrode active material of the present invention for a sodium ion secondary battery comprises a lithium sodium-based compound containing lithium (Li), sodium (Na), iron (Fe), and oxygen (O). When such a lithium sodium-based compound is employed as a positive electrode active material of a sodium ion secondary battery, Na ions are released from the lithium sodium-based compound during charging processes, and stored in the lithium sodium-based compound in discharging processes.

It is preferred that the lithium sodium-based compound has an Olivine structure. The lithium sodium-based compound having an Olivine structure will be discussed by taking lithium sodium iron silicate as an example. Lithium sodium iron silicate is constituted by $LiO_4$, $NaO_4$, $FeO_4$, and $SiO_4$. Each of these oxides has a tetrahedral structure in which a center element is surrounded by four oxygen atoms. The tetrahedral structures of $LiO_4$, $NaO_4$, $FeO_4$, and $SiO_4$ are called a Li—O tetrahedron, a Na—O tetrahedron, a Fe—O tetrahedron, and a Si—O tetrahedron, respectively.

Moreover, the lithium sodium-based compound may contain a transition metal element in addition to lithium (Li), sodium (Na), iron (Fe), and oxygen (O). It is preferred that the transition metal element is an element which can exhibit variable valency such as a valency of two or three. Examples of the transitional metal element which can be a constituent element of the lithium sodium-based compound include Mn, Co, Ni, and so on.

It is preferred that the lithium sodium-based compound has tetrahedrons each including a center element which is not stored or released during charging and discharging processes. The tetrahedrons each including a center element which is not stored or released during the charging and discharging processes play a role of structural pillars and contribute to stabilization of the structure of the lithium sodium-based compound. Examples of the center element which is not inserted or extracted during the charging and discharging processes include silicon (Si), phosphorus (P), and sulfur (S).

It is preferred that the lithium sodium-based compound is formed by replacing lithium which has occupied lithium sites of a lithium-based compound with sodium. Use of a lithium-based compound as a positive electrode active material of a sodium ion secondary battery makes it possible to insert Na into lithium sites of the lithium-based compound during charging and discharging processes, and as a result, form a lithium sodium-based compound. This mechanism will be discussed by taking an example in which the lithium-based compound is Olivine-structured lithium iron silicate $Li_2FeSiO_4$.

Figure 1:
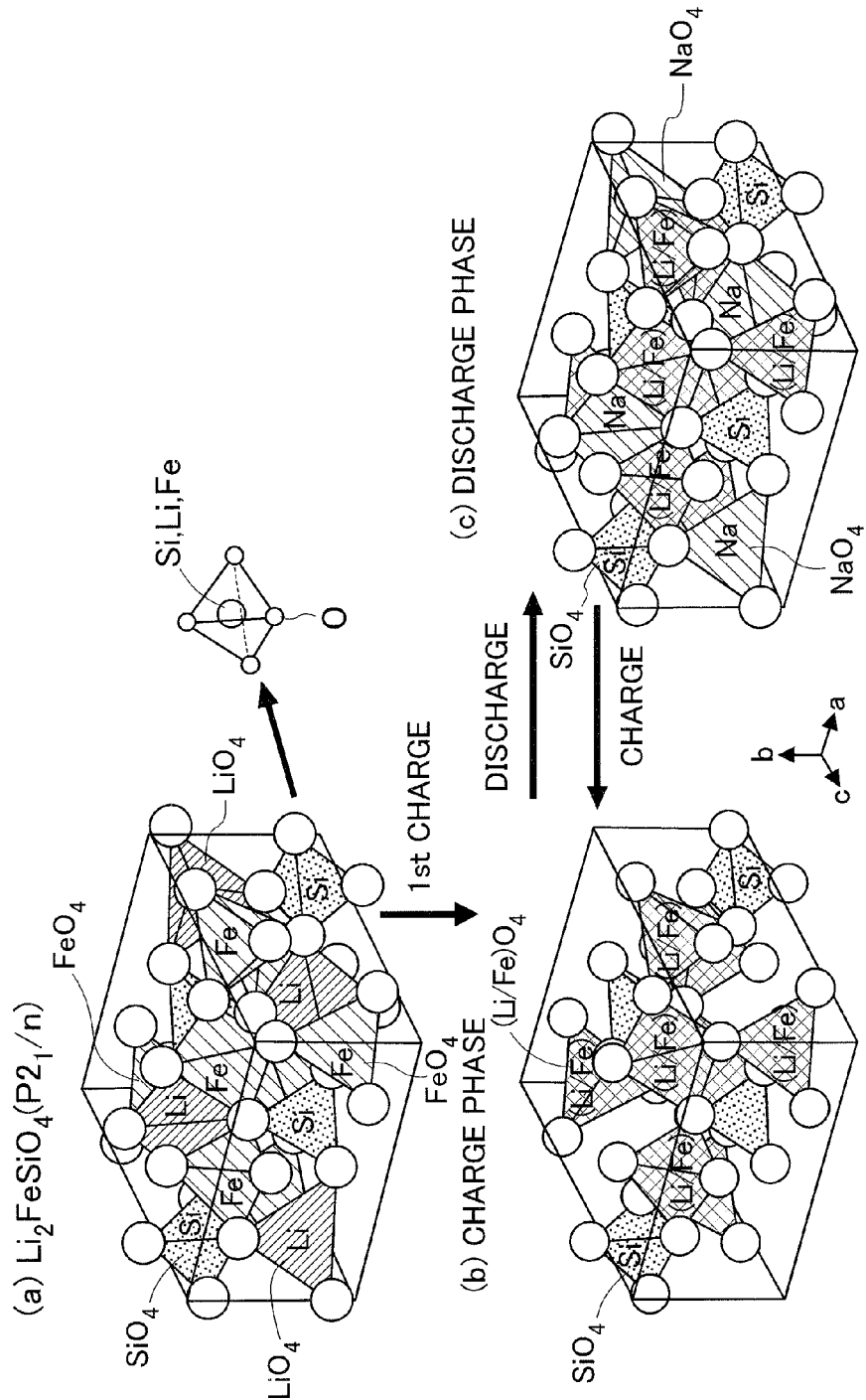
FIG. 1 is an explanatory diagram illustrating changes in crystal structure of a lithium-based compound caused by electric charge and discharge when the lithium-based compound is incorporated in a sodium battery as a positive electrode active material. The upper right part of FIG. 1 is a schematic diagram showing one of the different kinds of tetrahedrons constituting the lithium-based compound. The upper left part of FIG. 1 is a schematic diagram illustrating a crystal structure of the lithium-based compound before charging or discharging processes. The lower left part of FIG. 1 is a schematic diagram illustrating a crystal structure of a charge phase. The lower right part of FIG. 1 is a schematic diagram illustrating a crystal structure of a discharge phase.

As shown in the upper right part of FIG. 1, $Li_2FeSiO_4$ contains Li, Fe, Si and O as essential components. In the Olivine-structured lithium-based compound, Li—O tetrahedrons, Fe—O tetrahedrons, and Si—O tetrahedrons, each having a tetrahedral structure shown in the upper left part of FIG. 1, are regularly arranged.

When $Li_2FeSiO_4$ is first charged, $Li^+$ ions in part of the Li—O tetrahedrons are released into an electrolyte as shown in the lower left part of FIG. 1. Besides, Li which has occupied Li sites of the remaining Li—O tetrahedrons changes positions with Fe which has occupied Fe sites of the Fe—O tetrahedrons, so (Li/Fe)—O tetrahedrons in which Li or Fe is inserted again in center element sites. Since Li and Fe are randomly reinserted in the center element sites in the (Li/Fe)—O tetrahedrons, the Li—O tetrahedrons and the Fe—O tetrahedrons are randomly arranged after the first charging process. On the other hand, the Si—O tetrahedrons hardly changes during the first charging process. Thus, a charge phase is formed.

Next, when a first discharge is carried out as shown in the lower right part of FIG. 1, Na ions are inserted into sites from which Li ions have been extracted and, as a result, form Na—O tetrahedrons. Thus, a discharge phase is formed. Namely, at least part of Li is replaced with Na. At this time, lithium sodium iron silicate is formed.

Lithium sodium iron silicate formed by charging and discharging processes repeats Na insertion and extraction in subsequent charging and discharging processes. Since discharge capacity in second and subsequent discharging processes gradually decreases as the number of cycles increases, it is unlikely that all Na ions are released by each of the discharging processes. Hence, a small amount of Na ions once inserted by the first discharging process remain in the lithium sodium iron silicate even during second and subsequent charging processes, and the compound keeps the form of lithium sodium iron silicate containing Na. Hence, if lithium iron silicate is employed as a positive electrode active material in a sodium ion secondary battery, the compound keeps the form of lithium sodium iron silicate containing sodium after a first discharging process.

The example in which the lithium sodium-based compound is lithium sodium iron silicate has been described above. The lithium sodium-based compound is not limited to this and other lithium sodium-based compounds can be formed by causing an essentially sodium-free lithium-based compound to make a battery reaction using sodium ions as a charge carrier.

It is preferred that the lithium sodium-based compound is a compound capable of storing and releasing Na ions. It is more preferred that the aforementioned lithium sodium-based compound further contains at least one of silicon (Si) and phosphorus (P), and comprises, for example, at least one of a lithium sodium silicate-based compound containing Li, Na, Fe, Si, and O and a lithium sodium phosphate-based compound containing Li, Na, Fe, P, and O. Both the lithium sodium silicate-based compound and the lithium sodium phosphate-based compound have an Olivine structure and can be formed by causing an essentially Na-free lithium silicate-based compound and an essentially Na-free lithium phosphate-based compound to make battery reactions, respectively.

Phase changes of the lithium sodium silicate-based compound during charging and discharging processes has been discussed above by taking an example of lithium sodium iron silicate.

It is preferred that the lithium sodium silicate-based compound is expressed by a composition formula $Li_{2+a-b-c}Na_cA_bFe_{1-x}M_xSiO_{4+\delta}$, (in which A is at least one element selected from the group consisting of K, Rb, and Cs; M is at least one element selected from the group consisting of Mg, Ca, Al, Ni, Nb, Ti, Cr, Cu, Zn, Zr, V, Mo and W; and the respective subscripts satisfy the following conditions: $0 \le a < 1$, $0 \le b < 0.2$, $0 < c \le 2$, $0 \le x \le 0.5$, and $\delta \ge 0$). It is preferred that the lithium sodium silicate-based compound has an Olivine structure, and belongs to $P2_1/n$ space group of the monoclinic crystal system.

The lithium sodium silicate-based compound is formed by causing a lithium silicate-based compound to make a battery reaction using Na ions as a charge carrier. It is preferred that the lithium silicate-based compound is expressed by a compositional formula $Li_{2+a-b}A_bFe_{1-x}M_x\text{-}SiO_{4+\delta}$, in which A is at least one element selected from the group consisting of K, Rb, and Cs; M is at least one element selected from the group consisting of Mg, Ca, Al, Ni, Nb, Ti, Cr, Cu, Zn, Zr, V, Mo and W; and the respective subscripts satisfy the following ranges: $0 \le a < 1$, $0 \le b < 0.2$, $0 < c \le 2$, $0 \le x \le 0.5$, and $\delta \ge 0$. The lithium silicate-based compound can be produced, for example, by a molten salt method, a solid phase method, a hydrothermal method and so on.

The lithium sodium phosphate-based compound is constituted by Li—O octahedrons, Na—O octahedrons, Fe—O octahedrons, and P—O tetrahedrons. In charging and discharging processes, the P—O tetrahedrons having P as center elements hardly change, the Fe—O octahedrons and the Li—O octahedrons change into (Fe/Li)—O octahedrons and at least part of Li is released and Na is stored in/released from Li sites from which Li has been released. In the charging and discharging processes, the P—O tetrahedrons, which hardly change, play a role of pillars.

It is preferred that the lithium sodium phosphate-based compound is formed by replacing lithium which has occupied lithium sites of a lithium phosphate-based compound with sodium. Use of a lithium phosphate-based compound as a positive electrode active material of a sodium ion secondary battery makes it possible to insert Na into lithium sites of the lithium phosphate-based compound in charging and discharging processes, and as a result, form a lithium sodium phosphate-based compound.

The lithium sodium phosphate-based compound has an Olivine structure and is formed, for example, by causing a lithium phosphate-based compound to make a battery reaction using Na ions as a charge carrier. A mechanism of changing the lithium phosphate-based compound into the lithium sodium phosphate-based compound by a battery reaction is similar to the mechanism of changing the lithium silicate-based compound into the lithium sodium silicate-based compound by a battery reaction as shown in FIG. 1. That is to say, Li is released from a lithium phosphate-based compound by a first charging process. Next, a first discharge reaction using Na ions as a charge carrier causes Na to be stored in vacancies from which Li has been released and as a result forms a lithium sodium phosphate-based compound. Second and subsequent charging and discharging processes cause repetition of Na release and storage. Thus a lithium sodium phosphate-based compound is formed by causing a lithium phosphate-based compound to make a battery reaction using Na ions as an ionic charge carrier.

Examples of the lithium phosphate-based compound include lithium iron phosphate. Examples of the lithium iron phosphate include $LiFePO_4$, $Li_3Fe_2(PO_4)_3$, $Li_2FeP_2O_7$, and $Li_2FePO_4F$. Among them, $Li_2FeP_2O_7$, $LiFePO_4$, and $Li_2FePO_4F$ have Olivine crystal structures and $Li_3Fe_2(PO_4)_3$ has a Nasicon crystal structure. Particularly, $LiFePO_4$ is preferred. Upon replacing lithium which has occupied lithium sites of such a lithium iron phosphate with sodium, lithium sodium iron phosphate can be obtained. Examples of the lithium sodium iron phosphate include $Li_{1-c}Na_cFePO_4$ (0<c≤1), $Li_{3-c}Na_cFe_2(PO_4)_3$ (0<c≤3), $Li_{2-c}Na_cFeP_2O_7$ (0<c≤2), $Li_{2-c}Na_cFePO_4F$ (0<c≤2).

The positive electrode active material of the present invention has a lithium sodium-based compound. The positive electrode active material, for example, only comprises the lithium sodium-based compound. It is preferred that the positive electrode active material is a composite material of the lithium sodium-based compound and an electrically conductive material. In this case, the positive electrode active material has an improvement in electric conductivity and an increase in electric capacity.

The composite material of the lithium sodium-based compound and the electrically conductive material will be described below.

It is preferred that the electrically conductive material comprises a carbon material. Preferably the carbon material comprises amorphous carbon formed by thermal decomposition of a carbon raw material. For example, saccharides such as dextrin and sucrose can be used as the carbon raw material. Acetylene black (AB), Ketjenblack® (KB), vapor grown carbon fiber (VGCF) and so on can also be used as the carbon material.

It is preferred that the composite material comprises secondary particles which are aggregates of a plurality of primary particles. Each of the primary particles comprises a core portion formed of a lithium sodium-based compound, and a carbon covering portion formed of a carbon material and covering a surface of the core portion. The core portions of the primary particles have a relatively small average diameter and finely dispersed in each of the secondary particles. It is preferred that the core portions formed of the lithium sodium-based compound have a single phase containing especially little impurities. When the composite material is used as a positive electrode active material of a battery, the core portions make a battery reaction of storing and releasing sodium ions. Moreover, surfaces of the core portions are covered with the carbon covering layer formed of the carbon material. The carbon covering layer has an electric conductivity (electron conductivity) and increases electric conductivity between the core portions. Therefore, a battery using the composite material as a positive electrode active material attains good charge and discharge characteristics.

When the entire composite material is taken as 100% by mass, a mass ratio of the lithium sodium-based compound is preferably not less than 80% by mass and not more than 95% by mass, and more preferably not less than 85% by mass and not more than 94% by mass. When the mass ratio of the lithium sodium-based compound is excessively small, a portion of the composite material contributing to a battery reaction is so small that there is a risk that battery capacity may be low. On the other hand, when the mass ratio of the lithium sodium-based compound is excessively large, relatively the carbon covering portion is so small that there is a risk that electric conductivity of the composite material may be low.

The carbon covering portion is constituted by the carbon material (carbon particles). The carbon particles increase electric conductivity of the composite material. The carbon particles cover part or all of surfaces of the core portions.

When the entire composite material is taken as 100% by mass, a mass ratio of the carbon material is preferably not less than 5% by mass and not more than 20% by mass, and more preferably not less than 6% by mass and not more than 15% by mass. When the mass ratio of the carbon material is excessively small, there is a risk that electric conductivity of the composite material may be low. When the mass ratio of the carbon material is excessively large, relatively a mass ratio of the core portions is so small, that is to say, a portion of the composite material contributing to a battery reaction is so small that there is a risk that battery capacity of the composite material may be low.

Examples of a method for compositing the lithium sodium-based compound and the electrically conductive material include 1) a method comprising an energy imparting step and a heat treatment step, and 2) a method comprising an energy imparting step, a granulation step and a heat treatment step.

In regard to the compositing method 1), in the energy imparting step, a compound raw material, which is a raw material of a lithium sodium-based compound, and a carbon raw material, which is a raw material of a carbon material, are mixed by being imparted with mechanical energy by milling, mechanofusion or the like. It is preferred to use acetylene black (AB), Ketjenblack® (KB), vapor grown carbon fiber (VGCF) or the like as the carbon raw material. It is also possible to use saccharides such as dextrin and sucrose as the carbon raw material.

In regard to the compositing method 2), in the energy imparting step, a compound raw material, which is a raw material of a lithium sodium-based compound, and a carbon raw material, which is a raw material of a carbon material, are mixed by being imparted with mechanical energy by milling. Next, in the granulation step, for example, by spray drying, primary particles are formed by covering surroundings of the compound raw material with the carbon raw material, and at the same time secondary particles are formed by causing a plurality of primary particles to aggregate. Then, in the heat treatment step, a lithium-based compound is formed from the compound raw material. In this case, it is preferred to use saccharides such as dextrin and sucrose as the carbon raw material.

In the stage of carrying out this compositing method, the compound raw material to be composited with the electrically conductive material may or may not contain sodium. When the lithium-based compound contains no sodium in this stage, the lithium-based compound stores sodium by being incorporated in a battery to become a sodium battery and electrically charged, and as a result forms a lithium sodium-based compound.

(2) Positive Electrode for Sodium Ion Secondary Battery

A positive electrode for a sodium ion secondary battery has the aforementioned positive electrode active material for a sodium ion secondary battery. It is preferred that this positive electrode comprises the aforementioned positive electrode active material for a sodium ion secondary battery, and a current collector.

For example, a positive electrode can be formed by preparing a slurry by adding a conductive assistant such as acetylene black (AB), Ketjenblack® (KB), and vapor grown carbon fiber (VGCF), a binder such as polyvinylidene difluoride (PVDF), polytetrafluoroethylene (PTFE), and styrene-butadiene rubber (SBR), and a solvent such as N-methyl-2-pyrrolidone (NMP) to the aforementioned positive electrode active material, and coating the slurry on a current collector. The amount of the conductive assistant used is not particularly limited, but can be, for example, 5 to 20 parts by mass with respect to 100 parts by mass of the positive electrode active material. Moreover, the amount of the binder used is not particularly limited, but can be, for example, 5 to 20 parts by mass with respect to 100 parts by mass of the positive electrode active material. A positive electrode can also be produced by another method comprising kneading and forming a film of a mixture of the positive electrode active material, the aforementioned conductive assistant, and the aforementioned binder by using a mortar, a press machine and the like, and pressure bonding the film to a current collector by a press machine.

The material of the current collector is not particularly limited, and can be a conventionally used material such as aluminum foil, aluminum mesh, and stainless mesh. A carbon nonwoven cloth, a carbon woven cloth or the like can also be used as the current collector.

Shape, thickness and the like of the positive electrode for a sodium ion secondary battery are not particularly limited, but preferably the positive electrode has a thickness of 10 to 200 μm and more preferably 20 to 100 μm by filling up the positive electrode active material and then compressing the material. Therefore, in order to have the aforementioned thickness after compression, the amount of the positive electrode active material to be filled up should be suitably determined in accordance with the kind, structure and the like of a current collector to be used.

(3) Sodium Ion Secondary Battery

A sodium ion secondary battery has the aforementioned positive electrode for a sodium ion secondary battery. The sodium ion secondary battery has the aforementioned positive electrode for a sodium ion secondary battery, a negative electrode and an electrolyte solution.

The negative electrode can be metal sodium. Moreover, it is preferred that the negative electrode comprises an element which can store and release sodium ions and can be alloyed with sodium and/or a compound containing such an element which can store and release sodium ions and can be alloyed with sodium. It is preferred that the aforementioned element which can be alloyed with sodium is at least one of tin (Sn), carbon (C), and silicon (Si). Examples of a negative electrode material containing carbon include carbon-based materials such as hard carbon. Examples of the negative electrode material containing Si include silicon-based materials such as $SiO_x$ ($0.5 \leq x \leq 1.5$). In general, a secondary battery using metal sodium as a negative electrode is called a sodium secondary battery, and a second battery using a material other than metal sodium as a negative electrode is called a sodium ion secondary battery.

It is preferred to use a solution of an electrolyte in a nonaqueous solvent as the electrolyte solution. It is preferred that the electrolyte can be combined with each of Na ions and Li ions as cations of a salt. Since Li has a higher ionization tendency than Na, when Na is dissolved in an electrolyte solution, as is often the case, Li is also dissolved in the electrolyte solution. Therefore, not only Na ions but also Li ions in the electrolyte solution can contribute to ion transportation. Examples of such an electrolyte include $NaPF_6$, $NaBF_4$, and $NaClO_4$.

When the entire electrolyte solution is taken as 100% by mass, it is preferred that concentration of the electrolyte is 0.5 mol/L to 1.7 mol/L. Examples of the nonaqueous solvent include known ethylene carbonate, diethylene carbonate, dimethyl carbonate, propylene carbonate, and dimethyl carbonate.

The aforementioned sodium ion secondary battery can be mounted on a vehicle. It is preferred that the vehicle is an electric vehicle or a hybrid vehicle. It is preferred that the sodium ion secondary battery is connected, for example, to a travel motor mounted on a vehicle and used as a driving source. In this case, the sodium ion secondary battery can output high driving torque for a long time. Moreover, the aforementioned sodium ion secondary battery can be mounted on devices other than a vehicle such as a personal computer and a portable communication device.

Although the embodiments of the present invention have been described heretofore, the present invention is not limited to the aforementioned embodiments. Various modifications and alterations of the present invention will become apparent to those skilled in the art without departing from the spirit of the present invention.

Example 1

Secondary batteries using lithium iron silicate as a positive electrode active material were produced and their battery characteristics were measured.

(Preparation of Positive Electrode Active Material)

In an energy imparting step, 1.0 mol of ferric oxide ($Fe_2O_3$) (produced by Kojundo Chemical Laboratory Co., Ltd., purity: 99.99%), 1.1 mol of lithium carbonate $Li_2CO_3$ (produced by Kishida Chemical Co., Ltd., purity: 99.5%), 1.0 mol of silica $SiO_2$ (produced by Nippon Aerosil Co., Ltd.), and 1.2 mol of dextrin hydrate (produced by Wako Pure Chemical Industries, Ltd.) were wet mixed. The wet mixing was carried out by a bead mill ($ZrO_2$ beads having a diameter of 100 μm) for 3.5 hours.

In a granulation step, the mixed solution obtained above was spray dried by a thermal spray device. The thermal spray device used was trade name MDL-050M produced by Fujisaki Electric Co. Ltd. In spray drying by the thermal spray device, the mixed solution obtained above was supplied to a sprayer, while the air was supplied to a gas supply portion at a supply air flow rate of 0.80 m³/min. The air from a nozzle of the sprayer had a primary pressure of 0.7 MPaG, and a flow rate of 40 mL/min. The mixed solution was supplied at a flow rate of 20 mL/min. An inlet temperature of a drying chamber was controlled to 200 deg. C. Gas pressure inside the drying chamber was controlled to 4 kPa. Exhaust gas temperature at a gas exhausting portion was controlled to 91 deg. C.

In a heat treatment step, heat treatment was applied to the powder obtained above in an atmosphere of $CO_2:H_2$ (70:30 cc) at a temperature of 700 deg. C. for 2 hours. After cooled to room temperature, the treated powder was subjected to X-ray diffraction (XRD) analysis and scanning electron microscope (SEM) observation. As a result, it was demonstrated that obtained was a composite material of $Li_2FeSiO_4$ having an Olivine structure and belonging to $P2_1/n$ space group of the monoclinic crystal system, and carbon.

The SEM observation of the composite material showed that secondary particles had an approximately spherical shape and a carbon covering layer having a murky shape was present on surfaces of the secondary particles. A number of primary particles aggregated inside each of the secondary particles and each of the primary particles comprised a core portion comprising Olivine structured $Li_2FeSiO_4$, and a carbon covering layer covering a surface of the core portion.

(Sodium Cell Production and Electric Characteristics Evaluation)

Two kinds of sodium batteries were produced by using the aforementioned composite material and their electric characteristics were evaluated.

<Sodium Battery 1>

First, an electrode having the following composition was produced. The electrode comprised the above-produced composite material of $Li_2FeSiO_4$ and carbon, acetylene black (AB), and polyvinylidene difluoride (PVDF) at a mass ratio of 85:5:10. The electrode having the aforementioned electrode composition was vacuum dried at 140 deg. C. for 3 hours.

Moreover, an electrolyte solution was prepared by dissolving $NaPF_6$ into a mixture of ethylene carbonate (EC) and diethylene carbonate (DEC) at a volume ratio of 1:1. The electrolyte solution comprised EC and DEC at a volume ratio of 1:1 and contained 1 mol/L of $NaPF_6$.

A coin-shaped sodium cell as a sodium battery 1 was fabricated by using a glass filter as a separator and sodium metal foil as a negative electrode together with the aforementioned electrode and the aforementioned electrolyte solution.

A charge and discharge test was performed on the sodium cell at 30 deg. C. As for test conditions, charge and discharge were repeated between 1.0 V and 4.1 V with a current at a current density of 0.05 $mA/cm^2$. Only for a first charge, a constant-voltage current was kept charged at 4.1 V for 10 hours. Results of the charge and discharge test are shown in FIG. 2.

Figure 2:
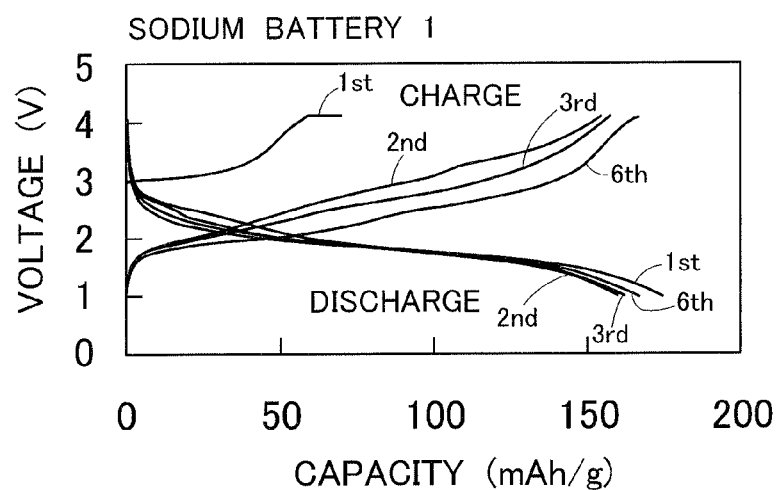
FIG. 2 is a graph showing charge and discharge curves of a sodium battery 1 in Example 1.

As shown in FIG. 2, a first charge capacity was as low as about 70 mAh/g. Both discharge capacity and charge capacity after the first charge capacity were as high as about 150 mAh/g.

<Sodium Battery 2>

Next, a lithium cell was fabricated by using the aforementioned composite material before the battery reaction as a positive electrode active material. The lithium cell also used metal lithium as an opposite electrode and an electrolyte solution containing 1 mol/L of $LiPF_6$. A solvent of the electrolyte solution comprised ethylene carbonate (EC) and dimethylene carbonate (DMC) at a volume ratio of 1:1. This lithium cell was charged only once to 4.8 V with a constant-voltage current at a current density of 0.05 $mA/cm^2$ at a temperature of 30 deg. C.

Figure 3:
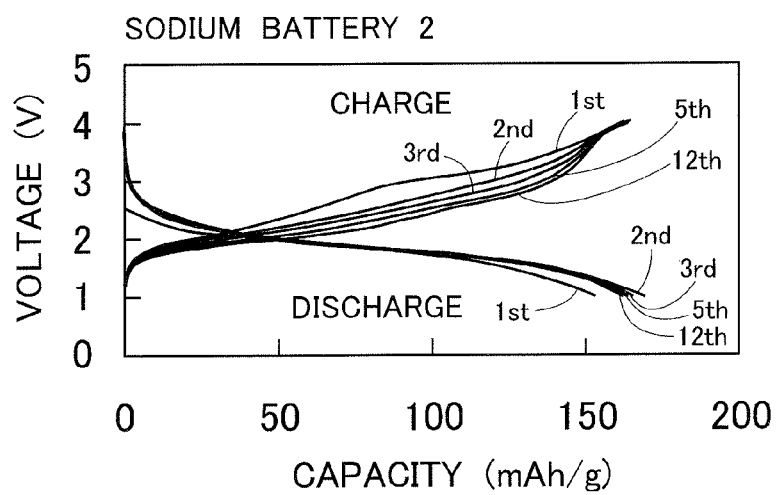
FIG. 3 is a graph showing charge and discharge curves of a sodium battery 2 in Example 1.

A sodium cell similar to the above sodium battery 1 was fabricated as a sodium battery 2 by using the electrode of the lithium cell after the first electric charge. A charge and discharge test was performed on this sodium cell under the same conditions as above. It should be noted that the charge and discharge test started with a first discharge. Results of the charge and discharge test are shown in FIG. 3. As shown in FIG. 3, both discharge and charge capacities including a first charge capacity were as high as not less than 150 mAh/g.

Reference Example 1

Lithium Battery 1

A lithium cell as a lithium battery 1 was fabricated by using the aforementioned composite material and subjected to a charge and discharge test. A positive electrode of the lithium battery 1 was similar to that of the sodium battery 2. A negative electrode was lithium metal. An electrolyte solution was prepared by dissolving 1 mol/L of $LiPF_6$ as an electrolyte in a nonaqueous solvent. The nonaqueous solvent comprised ethylene carbonate (EC) and dimethylene carbonate (DMC) at a volume ratio of 1:1.

Figure 4:
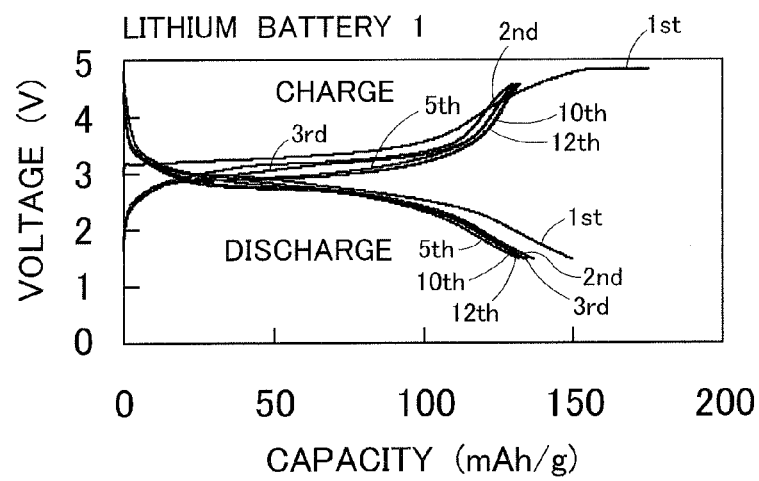
FIG. 4 is a graph showing charge and discharge curves of a lithium battery 1 as Reference Example 1.

A charge and discharge test was performed on this lithium cell between 1.5 to 4.5 V with a current at a current density of 0.05 $mA/cm^2$ at a temperature of 30 deg. C. Only for a first charge, a constant-voltage current was charged to 4.8 V. Results of the test are shown in FIG. 4. Table 1 summarizes battery characteristics of the sodium batteries 1, 2 and the lithium battery 1.

The charge and discharge characteristics of the lithium battery 1 are compared with those of the sodium batteries 1, 2. As described below, a potential difference between Na and a standard hydrogen electrode (SHE) is smaller than a potential difference between Li and a SHE.

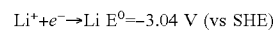

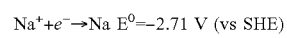

Therefore, when battery reactions are caused to the same positive electrode active material $Li_2FeSiO_4$, discharge and charge voltages generated by storage and release of Na ions in the positive electrode active material of a sodium cell are lower than those generated by storage and release of Li ions in the positive electrode active material of a lithium cell. In practice, when charge and discharge curves of the respective batteries are drawn as shown in FIGS. 2 to 4, discharge voltages of the sodium batteries 1, 2 are lower than that of the lithium battery 1. It is estimated from these phenomena that Na storage and release were carried out in the positive electrode active material of the sodium batteries 1, 2.

Next, when battery reactions were caused in the lithium battery 1, the positive electrode active material $Li_2FeSiO_4$ before charge/discharge, a charge phase after a first charge, and a discharge phase after a first discharge were analyzed for lattice constants a (Å), b(Å), c(Å) and an angle β(°) between the a axis and the c axis and unit cell volume (Å³). Results of the analysis are shown in Table 2. Numeric values in brackets in Table 2 show standard deviation.

TABLE 1

|  |  | SODIUM BATTERY 1 | SODIUM BATTERY 2 | LITHIUM BATTERY 1 |
|---|---|---|---|---|
| 1st CHARGE CAPACITY | (mAh/g) | 69.3 | 164.3 | 176.4 |
| 1st DISCHARGE CAPACITY | (mAh/g) | 175.0 | 153.2 | 148.6 |
| 2nd CHARGE CAPACITY | (mAh/g) | 154.7 | 163.9 | 129.0 |
| 2nd DISCHARGE CAPACITY | (mAh/g) | 161.2 | 168.8 | 135.8 |
| AVERAGE 1st DISCHARGE VOLTAGE | (V) | 1.90 | 1.78 | 2.63 |
| AVERAGE 2nd DISCHARGE VOLTAGE | (V) | 1.87 | 1.84 | 2.61 |

TABLE 2

|  | a (Å) | b (Å) | c (Å) | β (°) | VOLUME (Å$^3$) |
|---|---|---|---|---|---|
| BEFORE CHARGE/DISCHARGE | 8.2256(4) | 5.01441(9) | 8.2303(4) | 99.143(2) | 335.16 |
| CHARGE PHASE | 8.3811(6) | 5.0258(2) | 8.3564(3) | 103.459(6) | 342.33 |
| DISCHARGE PHASE | 8.3089(2) | 5.0378(1) | 8.276(1) | 98.01(1) | 343.06 |

As shown in Table 2, all the lattice constants a, b and c in the charge phase increased when compared to those before charge/discharge. The angle β between the a axis and the c axis in the charge phase greatly changed from the angle β before charge/discharge. Moreover, numeric values in the discharge phase had a tendency to return slightly to those before charge/discharge from those of the charge phase.

$Li_2FeSiO_4$ before charge/discharge had a calculated density of 3.21 g/cm$^3$. The charge phase after the first charge had a calculated density of 3.00 g/cm$^3$. The discharge phase after the first discharge had a calculated density of 3.13 g/cm$^3$.

The lattice constants increased and the density decreased in the charge phase of $Li_2FeSiO_4$ when compared with those before charge/discharge.

Table 2 shows structural changes of the positive electrode active material $Li_2FeSiO_4$ when the battery reactions were caused in the lithium cell. When battery reactions are caused in a sodium ion battery, it is assumed that structural changes are generated which are similar to the structural changes caused by insertion and extraction of lithium shown in Table 2.

That is to say, in a sodium battery using the positive electrode active material $Li_2FeSiO_4$, as shown in the lower left part of FIG. 1, Li is extracted from $Li_2FeSiO_4$ to form vacancies during a first charge. Next, as shown in the lower right part of FIG. 1, Na is inserted into $LiFeSiO_4$ to form lithium sodium iron silicate during a subsequent first discharge. During subsequent charge and discharge, Na insertion and extraction are repeated in lithium sodium iron silicate.

As shown in FIG. 4, in the lithium battery 1, a first charge capacity was as high as about 180 mAh/g, but a first discharge capacity remarkably decreased to about 150 mAh/g. This phenomenon indicates that part of Li ions released from the positive electrode active material during the first charge were not stored during the subsequent discharge and as a result initial efficiency was low. When Li ions are released from the positive electrode active material $Li_2FeSiO_4$ during the first charge, vacancies are formed and volume density decreases. During the following discharge, Li ions are stored in part of the vacancies of $LiFeSiO_4$ and volume density slightly increases. It is assumed that these are reasons why volume density of $Li_2FeSiO_4$ slightly changed during charge and discharge.

In contrast, as shown in FIG. 3, in the sodium battery 2, in which the electrode of the lithium battery 1 after the first charge was used in combination with the sodium opposite electrode, a first charge capacity and a first discharge capacity were on the same level. This is assumed to be because initial efficiency in inserting and removing Na ions was high.

Charge and discharge capacities of the sodium battery 2 shown in FIG. 3 are higher than those of the lithium battery 1 after the first charge capacity shown in FIG. 4. This is supposed to be because reactions of inserting and extracting Na ions are more likely to occur than reactions of inserting and extracting Li ions.

Example 2

Different kinds of secondary batteries using lithium iron phosphate as a positive electrode active material were produced and battery characteristics of the batteries were measured.

(Preparation of Positive Electrode Active Material)

1.0 mol of iron oxalate $FeC_2O_4\cdot 2H_2O$ (produced by Kishida Chemical Co., Ltd., purity: 99.9%), 1.1 mol of lithium carbonate $Li_2CO_3$ (produced by Kishida Chemical Co., Ltd., purity: 99.50), 1.0 mol of ammonium hydrogen phosphate $NH_4H_2PO_4$ (produced by Sigma-Aldrich, Japan, purity: 99%) were wet mixed. The wet mixing was carried out by a ball mill (trade name P-7 produced by Fritsch Japan Co., Ltd.) and acetone as a solvent. Mixing was conducted at 500 rpm for 2 hours. After mixing, the solvent was evaporated and heat treatment was applied at 800 deg. C. for 24 hours in a nitrogen atmosphere. XRD measurement showed that treated power was $LiFePO_4$ having an Olivine structure and belonging to Pnmb space group of the orthorhombic crystal system.

Next, in an energy imparting step, the $LiFePO_4$ powder obtained above was mixed with sucrose (produced by Wako Pure Chemical Industries, Ltd.) at a weight ratio of 1:1. The mixing was conducted by ball milling at a rotational speed of 300 rpm for 120 minutes. In a heat treatment step, heat treatment was applied to this mixture at a temperature of 700 deg. C. for 2 hours in a nitrogen atmosphere. Then the treated material was cooled to room temperature. XRD measurement and SEM evaluation showed that the treated material was a composite material of $LiFePO_4$ and a carbon material.

(Sodium Battery 3 Production and Electric Characteristics Evaluation)

Next, an electrode having the following composition was produced by using the aforementioned composite material as a positive electrode active material. The electrode comprised a composite material of LiFePO$_4$ and carbon, acetylene black (AB), and polyvinylidene difluoride (PVDF) at a mass ratio of 85:5:10. The electrode having the aforementioned composition was vacuum dried at 140 deg. C. for 3 hours. A lithium cell was fabricated by using this electrode and electrically charged only once. The lithium cell used lithium metal as an opposing electrode and an electrolyte solution comprising 1 mol/L of LiPF$_6$ as an electrolyte, and a nonaqueous solvent. The nonaqueous solvent comprised ethylene carbonate (EC) and dimethylene carbonate (DMC) at a volume ratio of 1:1. This lithium cell was charged to 4.2 V with a constant current at a current density of 0.05 mA/cm$^2$ at a temperature of 30 deg. C.

A sodium cell was fabricated by using the electrode of this lithium cell after the first charge. An electrolyte solution comprised ethylene carbonate (EC) and diethylene carbonate (DEC) at a volume ratio of 1:1 and 1 mol/L of NaPF$_6$. The sodium cell had a coin shape and used a glass filter as a separator, sodium metal foil as a negative electrode together with the aforementioned electrode and the aforementioned electrolyte solution. This was labelled as a sodium battery 3.

A charge and discharge test was performed on the sodium battery 3 at 30 deg. C. As for test conditions, charge and discharge were repeated between 2.0 V and 4.2 V with a current at a current density of 0.05 mA/cm$^2$. It should be noted that the charge and discharge test started with a first discharge. Results of the test are shown in FIG. 5.

Figure 5:
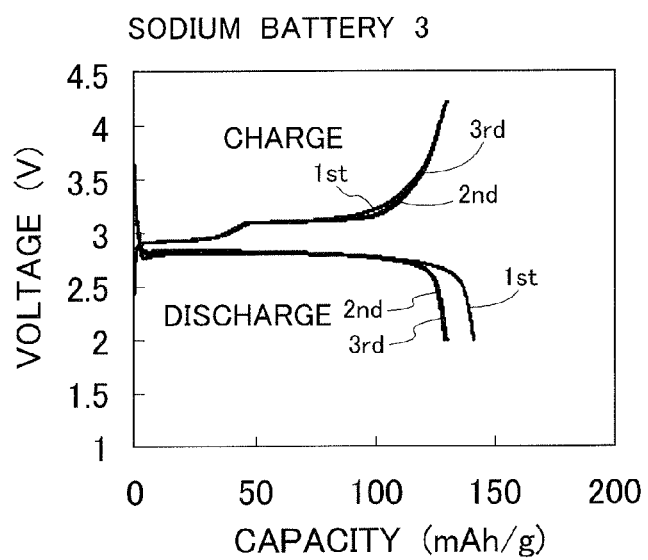
FIG. 5 is a graph showing charge and discharge curves of a sodium battery 3 in Example 2.

As shown in FIG. 5, an average charge voltage was about 3.1 V and an average discharge voltage was about 2.8. V. A first discharge capacity was about 141 mAh/g. A second discharge capacity was about 130 mAh/g, which was lower than the first discharge capacity.

Reference Example 2

Lithium Battery 2

A lithium cell as a lithium battery 2 was fabricated by using the aforementioned composite material (the composite of LiFePO$_4$ and the carbon material), and subjected to a charge and discharge test. A positive electrode of this lithium cell was similar to that of the sodium battery 3. A negative electrode material was lithium metal. An electrolyte solution was prepared by dissolving 1 mol/L of LiPF$_6$ as an electrolyte in a nonaqueous solvent. The nonaqueous solvent comprised ethylene carbonate (EC) and dimethylene carbonate (DMC) at a volume ratio of 1:1.

Figure 6:
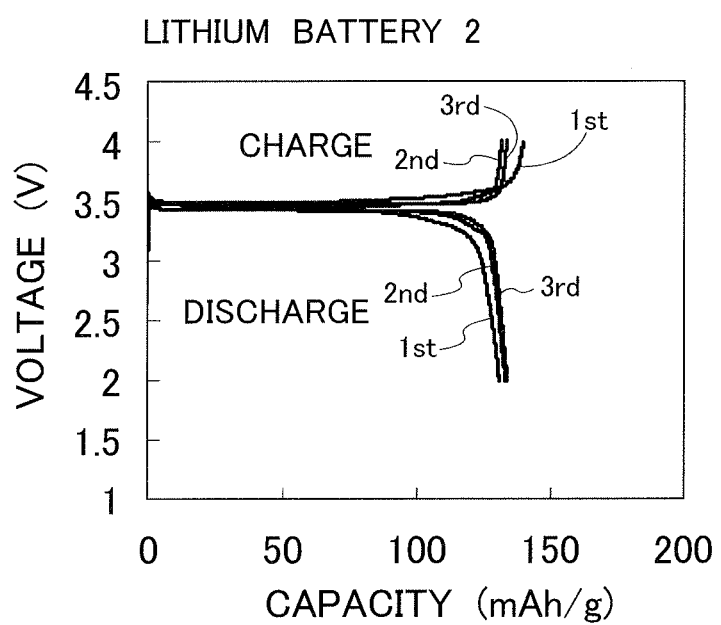
FIG. 6 is a graph showing charge and discharge curves of a lithium battery 2 as Reference Example 2.

A charge and discharge test was performed on this lithium battery 2 under the same conditions as those of the sodium battery 3, and results of the test are shown in FIG. 6. As shown in FIG. 6, a first charge capacity of the lithium battery 2 was about 140 mAh/g. A first discharge capacity was about 131 mAh/g. A second charge capacity was about 132 mAh/g, which was lower than the first charge capacity by about 8 mAh/g. Battery characteristics of the sodium battery 3 and the lithium battery 2 are summarized in Table 3.

TABLE 3

| | | SODIUM BATTERY 3 | LITHIUM BATTERY 2 |
|---|---|---|---|
| 1st CHARGE CAPACITY | (mAh/g) | 129.9 | 139.9 |
| 1st DISCHARGE CAPACITY | (mAh/g) | 141.2 | 130.8 |
| 2nd CHARGE CAPACITY | (mAh/g) | 129.8 | 131.8 |

TABLE 3-continued

| | | SODIUM BATTERY 3 | LITHIUM BATTERY 2 |
|---|---|---|---|
| 2nd DISCHARGE CAPACITY | (mAh/g) | 129.9 | 133.0 |
| AVERAGE 1st DISCHARGE VOLTAGE | (V) | 2.80 | 3.18 |
| AVERAGE 2nd DISCHARGE VOLTAGE | (V) | 2.81 | 3.20 |

When charge and discharge curves of the sodium battery 3 shown in FIG. 5 are compared with those of the lithium battery 2 shown in FIG. 6, discharge voltage of the sodium battery 3 was lower than that of the lithium battery 2. This suggests that storage and release of sodium ions were carried out also in the positive electrode active material LiFePO$_4$.

In addition, in the lithium battery 2 as shown in FIG. 6, a first charge capacity was large, and a first discharge capacity and subsequent charge/discharge capacities were lower than the first charge capacity. This suggests that Li was released from the positive electrode active material LiFePO$_4$ during a first charge, and part of the released Li was not stored in LiFePO$_4$ during a first discharge.

In contrast, in the sodium battery 3 using the electrode of the Li cell after the beforehand charge in combination with the Na electrode, as shown in FIG. 5, a first discharge capacity and subsequent charge/discharge capacities were as large as or larger than a first charge capacity. This is assumed to be because reactions of inserting and extracting Na ions were stably carried out.

What is claimed is:

1. A positive electrode active material for a sodium ion secondary battery, comprising a lithium sodium-based compound comprising lithium sodium iron silicate.

2. The positive electrode active material for a sodium ion secondary battery according to claim 1, wherein the lithium sodium-based compound is a lithium-based compound containing Li, Fe and O and is formed by replacing lithium which has occupied lithium sites of the lithium-based compound with sodium.

3. The positive electrode active material for a sodium ion secondary battery according to claim 1, wherein the lithium sodium-based compound further contains a transition metal element.

4. The positive electrode active material for a sodium ion secondary battery according to claim 1, wherein the lithium sodium iron silicate is expressed by a composition formula Li$_{2-b-c}$Na$_c$A$_b$Fe$_{1-x}$M$_x$SiO$_4$, in which A is at least one element selected from the group consisting of K, Rb, and Cs, M is at least one element selected from the group consisting of Mg, Ca, Al, Ni, Nb, Ti, Cr, Cu, Zn, Zr, V, Mo and W, and the respective subscripts satisfy the following conditions: 0≤b<0.2, 0<c≤2, and 0≤x≤0.5.

5. The positive electrode active material for a sodium ion secondary battery according to claim 1, wherein the lithium sodium-based compound is composited with a carbon material to form a composite material.

6. A positive electrode for a sodium ion secondary battery, having the positive electrode active material for a sodium ion secondary battery according to claim 1.

7. A sodium ion secondary battery having the positive electrode for a sodium ion secondary battery according to claim 6, a negative electrode having a negative electrode active material, and an electrolyte.

8. The sodium ion secondary battery according to claim 7, wherein the electrolyte comprises at least one selected from the group consisting of $NaPF_6$, $NaBF_4$, and $NaClO_4$.

* * * * *